Figure 1:
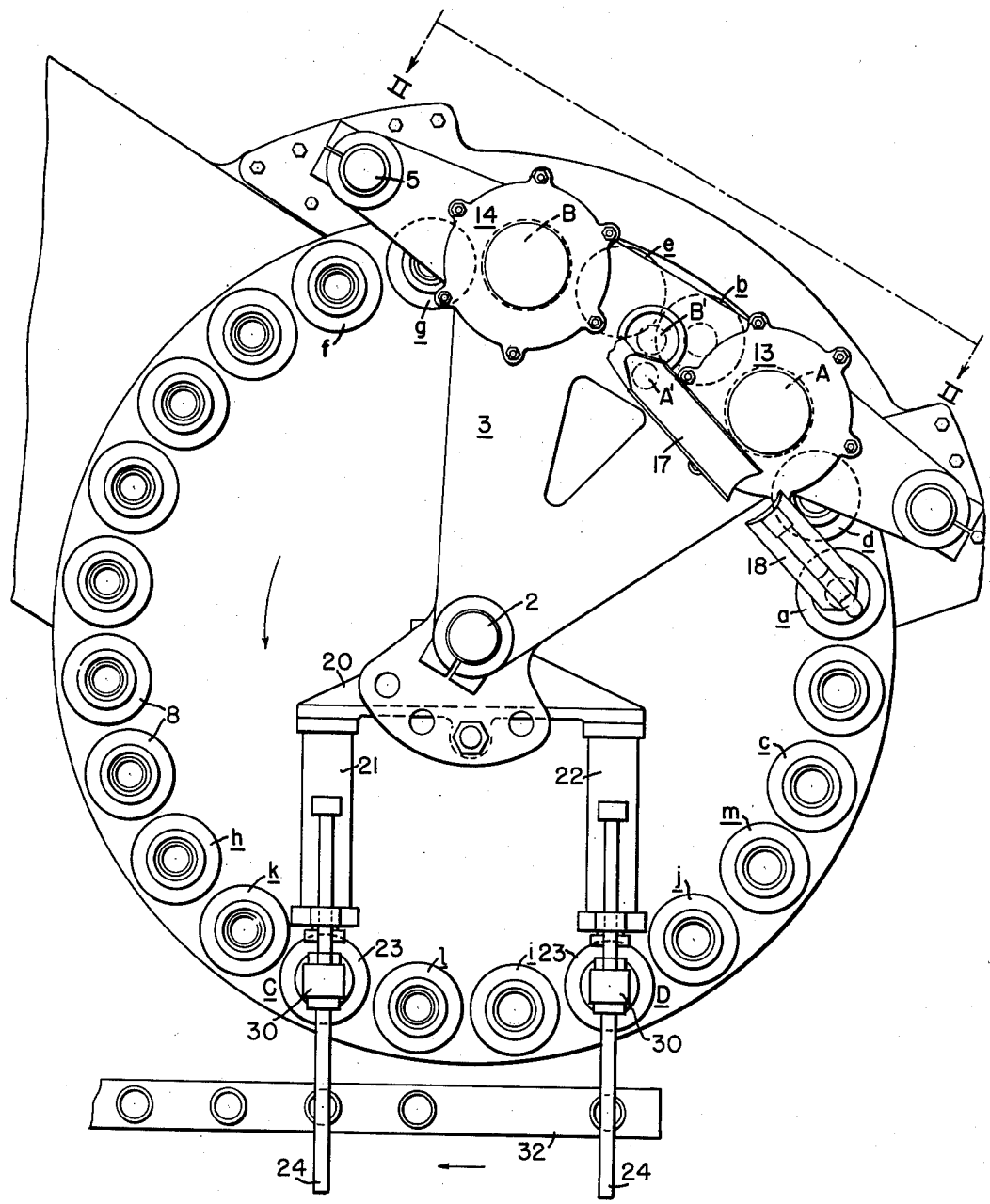

Jan. 31, 1956  R. P. CASSELL  2,732,665
APPARATUS FOR PRESS-MOLDING GLASS ARTICLES
Filed Feb. 26, 1955  4 Sheets-Sheet 1

INVENTOR.
Robert P. Cassell.
BY
William B. Wharton
ATTORNEY

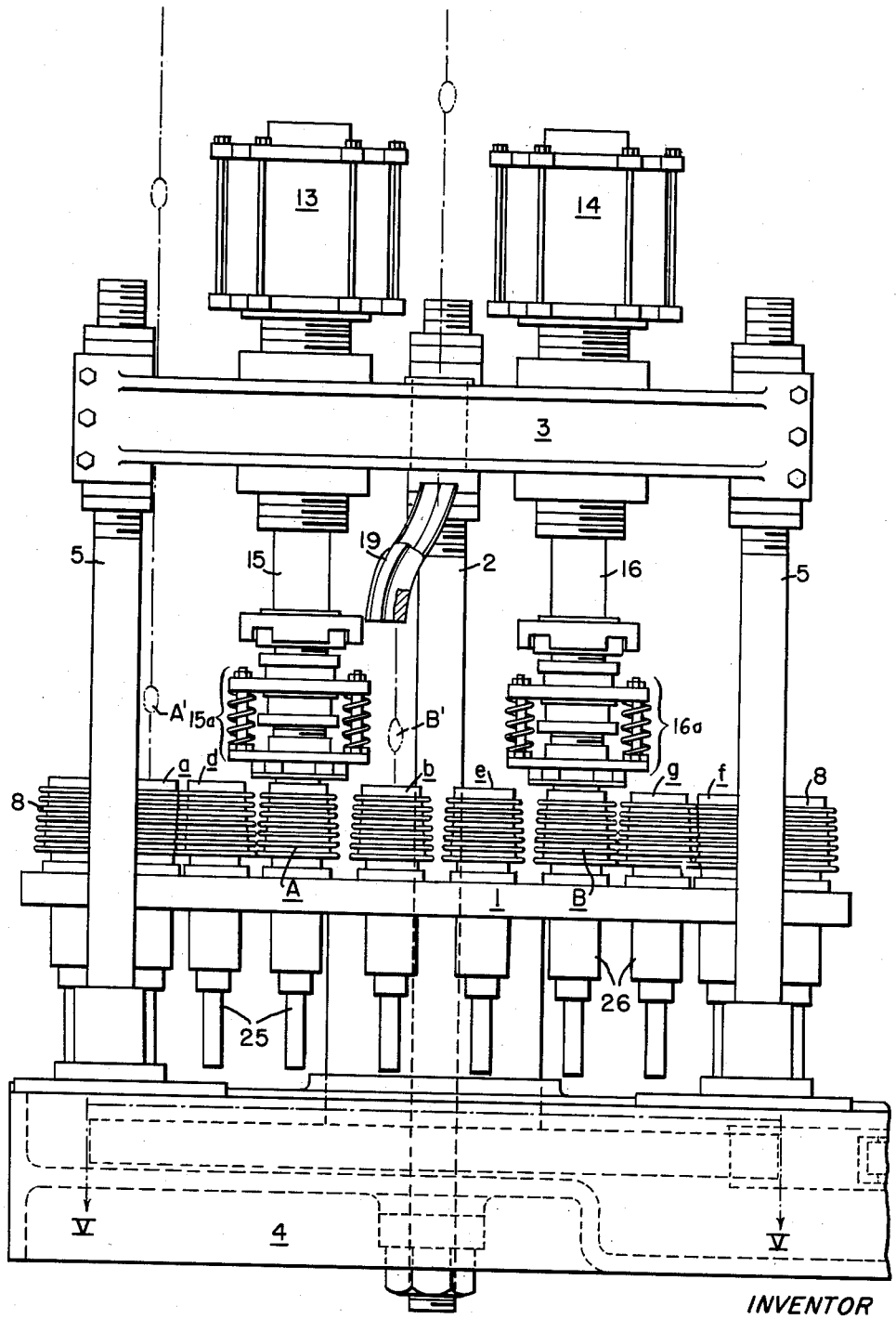
Fig. II

Jan. 31, 1956   R. P. CASSELL   2,732,665
APPARATUS FOR PRESS-MOLDING GLASS ARTICLES
Filed Feb. 26, 1953   4 Sheets-Sheet 3
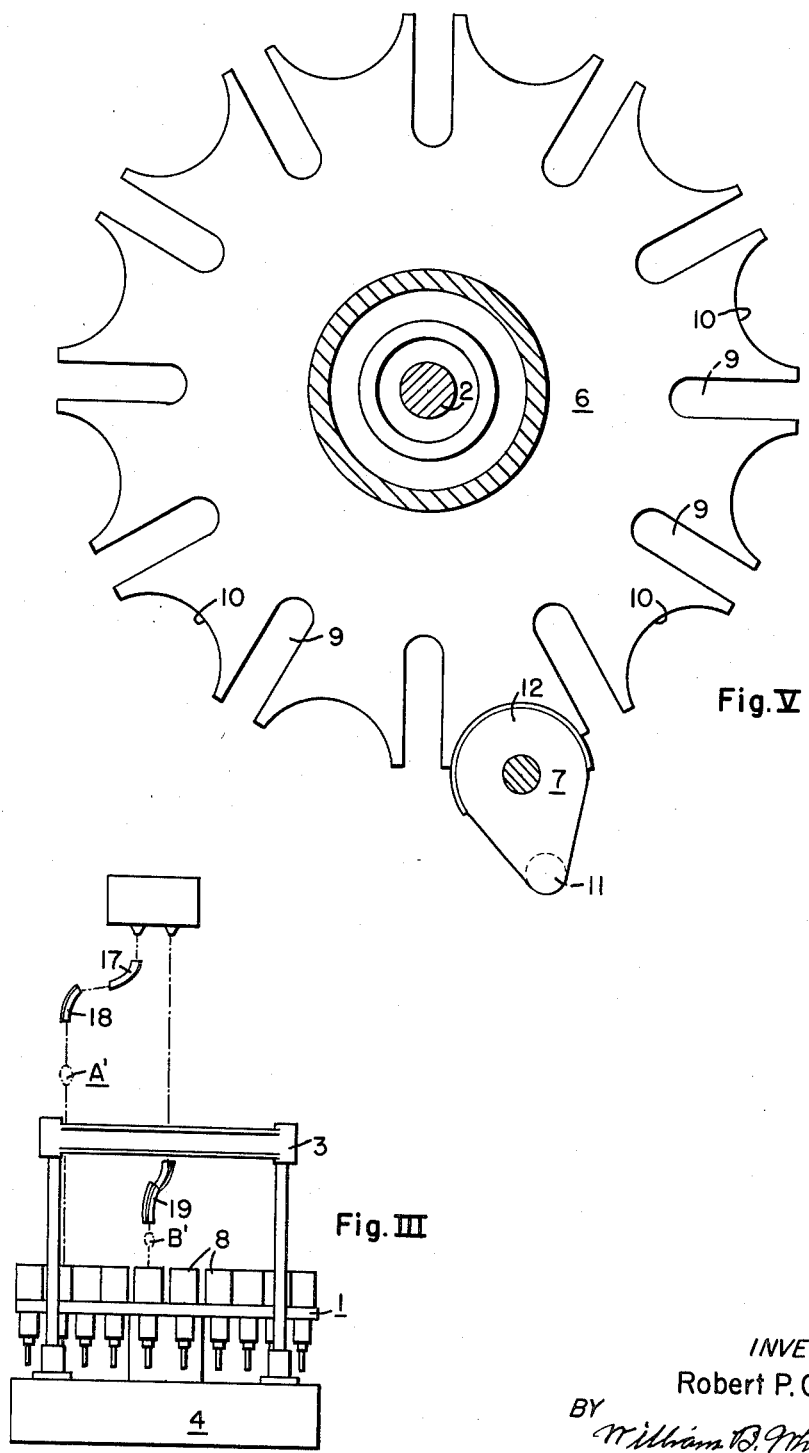
INVENTOR
Robert P. Cassell.
BY
ATTORNEY

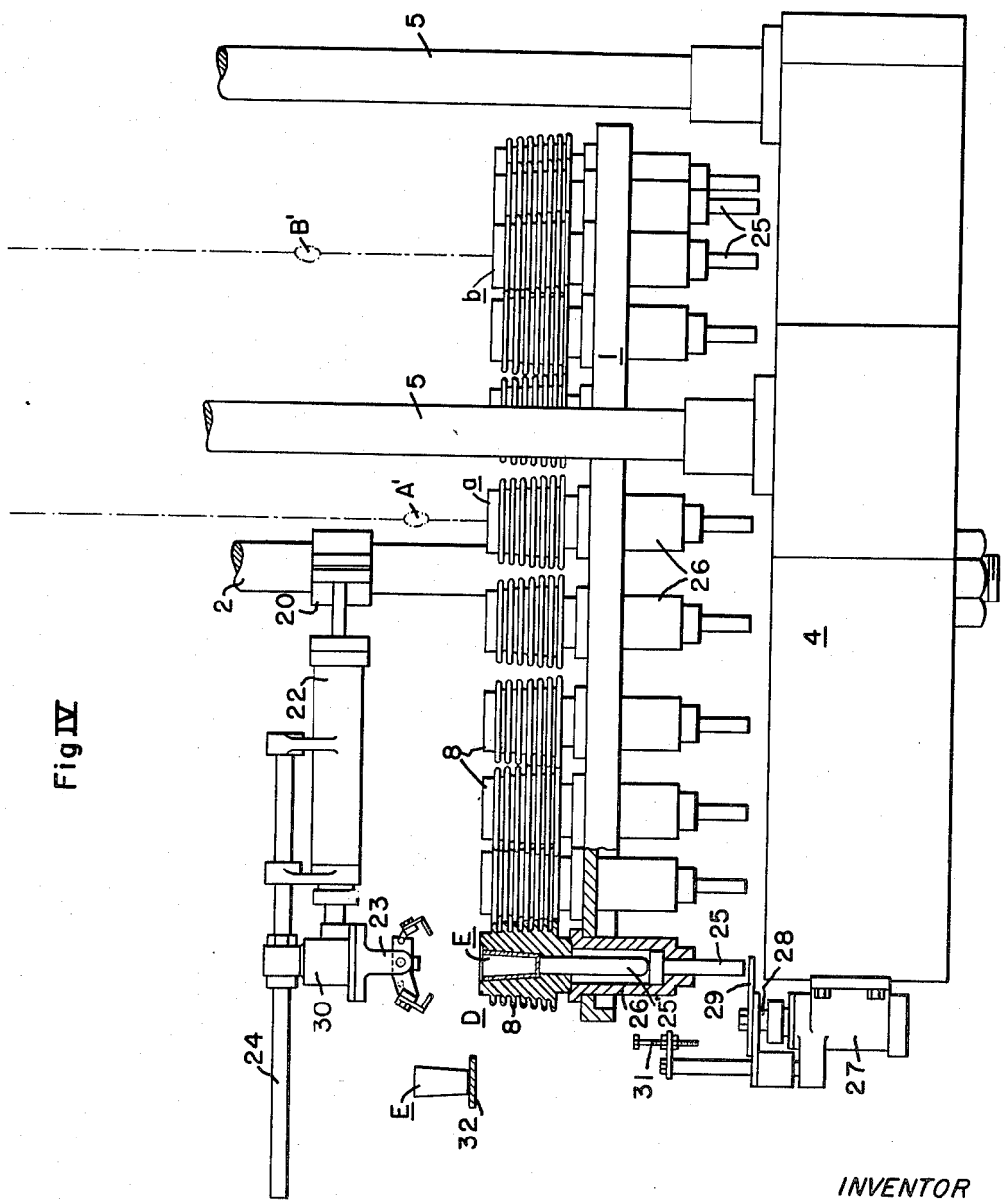

United States Patent Office 2,732,665
Patented Jan. 31, 1956

2,732,665
APPARATUS FOR PRESS-MOLDING GLASS ARTICLES

Robert P. Cassell, Jeannette, Pa., assignor to The Jeannette Glass Company, Jeannette, Pa., a corporation of Pennsylvania Application February 26, 1953, Serial No. 339,140

8 Claims. (Cl. 49—5)

This invention relates to apparatus for down-pressing glassware and particularly for the simple pressing of glass tumblers.

The object of the invention is to increase the production of a press-molding machine without impairing the perfection of the articles which are pressed, with particular reference to the high-speed pressing of glass tumblers and other glass articles the pressing of which is difficult.

Another and related object of the invention is to provide apparatus of such great simplicity that it involves but little increase in machine investment or operating cost over the cost of providing and operating standard and conventional glass-pressing machines of lower productive capacity.

The glass industry long has desired apparatus for press-molding glassware which will operate in satisfactory manner to press-mold two or more glass articles simultaneously, thus increasing the production rate of the machine. It is possible in the blowing of glass articles to utilize an arrangement in which dual molds and twin blow-heads are used, with the production of glass articles accurately and uniformly shaped. In such blowing operation, however, the initial gob of glass first is distended into what is known as a "parison" by blowing or pressing and the parison then is blown to conform to the contour of a mold. Also, various forms of apparatus of relatively complicated structure have been proposed to obtain a dual or multiple straight pressing action.

In the above-mentioned blowing operation the glass will rise in the molds completely to form the articles which are in process of manufacture in a dual blowing by twin blowheads in spite of slight inequality in the weight of the gobs fed to dual cavity molds. Any slight variation in the wall thickness of the two tumblers so formed is of relatively minor importance. In the case of a simple press-molding operation, however, any inequality in the weight of the gobs in dual cavity molds results in inequality in the rise of the glass in the two mold cavities. In the production of drinking tumblers this creates a strong tendency for the dual mold cavity operation to give one perfect and one imperfect tumbler at each piston stroke if there be any appreciable difference in the weight of the gobs. Any apparatus designed to give a multiple pressing on a continuously moving mold-carrying table involves such structural complexity that it must be considered commercially undesirable.

Whereas the discussion herein is applied specifically to "tumblers" it is to be understood that it applies equally to other analogous hollow glass articles.

The present invention obtains the simultaneous pressing of a plurality of glass articles by use of simple apparatus and by following a simple operating procedure, to produce glass articles of complete and accurate structure. This is accomplished primarily by a simple but effective modification in the structural assembly of the well-known standard glass pressing machines of the step-by-step, or intermittent motion type and by a corresponding simple but effective modification in the method of operating such machines.

In the accompanying drawings illustrative of the embodiment of my invention:

Fig. I is a plan view of glass pressing apparatus constructed in accordance with my invention and capable of use in conducting the method thereof.

Fig. II is an elevation of the apparatus as viewed from the position indicated by broken lines II—II of Fig. I, illustrating the simultaneous feeding and pressing of gobs of viscous glass to and in molds of the apparatus.

Fig. III is a schematic elevation showing gob-feeding elements not shown in Fig. II.

Fig. IV is an elevation taken approximately at right angles to the height of the sheet carrying Fig. I with respect to the presentation of Fig. I, showing particularly one of the apparatus elements for discharging glass articles which have been press-molded as shown in Fig. II.

Fig. V is a horizontal section taken on V—V of Fig. II of the element which acts directly to advance the molds of the apparatus step-by-step.

Referring first to primary elements of the apparatus assembly herein shown, reference numeral 1 designates a mold-carrying turntable rotatably mounted on a center post 2. A fixed frame 3 is mounted in vertically adjustable relation to turntable 1 and base 4 on a screw-threaded portion of center post 2 and on threaded supporting columns 5 rising from the base 4. It has been noted above that my invention is appropriate to and is applied to primary apparatus of the intermittent motion or step-by-step type. As is usual in apparatus of that type, the turntable as herein shown is driven by a geneva 6 which is actuated directly by a motion plate, or crank, 7 which acts both as propelling means and as a detent. As also is common practice with apparatus of this type, the propulsion and dwell of the geneva are under the control of timing apparatus (not shown) which correlates and synchronizes the movements of the geneva with the action of the other elements of the apparatus. Mold-carrying turntable 1 supports a plurality of uniformly spaced "block" molds 8 each of which passes through a feeding station, a pressing station, and a discharging station.

It will be noted that in the novel assembly of my invention turntable 1 carries twice the number of molds 8 that there are propelling slots 9 and dwelling sockets 10 of the geneva to cooperate respectively with roller 11 and rounded detent portion 12 of crank 7. Each of the molds 8 is moved through two mold spaces, that is it is moved through a distance equal to twice the spacing between the centers of adjacent molds at each forward impulse of geneva 6 and turntable 1. Fixed frame 3 supports two independent fluid pressure cylinders 13 and 14 which actuate plungers 15 and 16 carrying the forming dies which cooperate with the molds 8 to form drinking tumblers or other glass articles. Although the two fluid pressure cylinders 13 and 14 act independently they are timed to act simultaneously, so that they provide plural pressing while still being self-adjusting in causing the glass of the gobs in presented molds to flow upwardly therein.

The two independently but simultaneously acting fluid pressure cylinders 13 and 14 by their position define two pressing stations A and B spaced apart by three mold spaces. When two of the molds 8 arrive at these two pressing stations they will already have received the gobs of glass which are to be formed in them. As noted, each forward impulse of turntable 1 moves the molds through two mold spaces. Thus (as shown in Fig. I) the mold in position $a$ two spaces removed from pressing station A and the mold in position $b$ two mold spaces removed from pressing station B simultaneously receive their gobs $A^1$ and $B^1$. The feeding stations $a$ and $b$ also are spaced apart three mold spaces. In passing from position $d$ to feeding position or station *b* an empty mold passes beneath plunger 15 which is raised during stepping of the turntable. Specifically as shown, the delivery of the gob to the mold at station *a* is by way of chutes 17 and 18 and the delivery of the gob to the mold at station *b* is by way of chute 19. Both the feeding of the gobs to the two molds at stations *a* and *b* and the pressing of the glass at stations A and B take place simultaneously during the dwell of the turntable to present molds at those stations.

During the next forward impulse of turntable 1 the two molds shown as fed at stations *a* and *b* are moved two mold spaces respectively into the pressing station A and B. The mold in position *c* is moved to feeding station *a* and the mold in position *d* is moved to feeding station *b*. The mold which has cooperated in the pressing operation in station A is moved to position *e* and the mold which has cooperated in the pressing operation in station B is moved to position *f*. At the following forward impulse the mold with its article pressed at station A is moved from position *e* to position *g*, passing beneath plunger 16 which is raised during stepping of the turntable. This described action I term a "leapfrog" action, inasmuch as an article which has already been pressed is carried past a pressing plunger which at the time of such passage is raised, and each mold receives its gob and is presented to a pressing plunger out-of-turn with respect to the sequence of molds on the turntable and the direction of rotation of the turntable. It will be noted that the mold in feeding station *b*, having passed through pressing station A is being fed while the mold which follows it and has previously been fed is being pressed at station A. At station B the mold in which a gob is being pressed is both led and followed by molds which have already been subjected to pressing at station A.

As the molds, with their articles pressed at pressing stations A and B are carried forward by the intermittent movement of turntable 1, they ultimately arrive at discharging instrumentalities which remove the formed articles from the molds in which they are pressed. Those instrumentalities are shown in Figs. I and IV of the drawings and are shown as carried by a bracket 20 mounted on center post 2 below the position of fixed frame 3 thereon. Like frame 3 bracket 20 does not rotate with turntable 1 but has a fixed position in the assembly. As shown in these figures, bracket 20 carries two fluid pressure assemblies comprising cylinders 21 and 22 which act to position each a tongs assembly 23 along a rod 24. Each of the rods 24 is mounted on one of the fluid pressure cylinders. The two discharging assemblies, like the pressing assemblies at stations A and B, are spaced from each other three mold spaces.

Fig. IV shows means for presenting the formed glass articles, one of which in the form of a tumbler E is shown below the pick-up tongs 23 and subject to the action of the other elements of a discharging assembly. Such illustrated means comprise a kick-up pin 25 which travels vertically in a tubular member 26 forming part of the mold assembly. Kick-up pin 25 bears against the lower end of a rod or "valve" 25$^1$. Prior to the discharging operation the upper end of valve 25$^1$ forms the bottom of the cavity in each of the molds 8. At each of the discharging stations C and D there are means for moving the pin 25 of the presented mold upwardly in contact with the bottom of the formed and cooled glass article to raise the article from the mold and into position to be grasped by tongs 23. Such means comprise a fluid pressure cylinder 27 carried by the base 4 of the machine. Fluid pressure cylinder 27 is arranged to act vertically and its plunger 28 carries a lifting plate 29 which bears against the lower end of pin 25. The stroke of the fluid pressure piston and the corresponding distance through which lifting plate is raised moves pin 25 and valve 25$^1$ upwardly through a distance sufficient to lift the formed tumbler E into tongs 23 and clear of the mold. An adjustable stop 31 limits upward movement of lifting plate 29.

The action at discharging stations C and D is similar to that in the pressing stations of the apparatus. A mold with its formed article is moved by one impulse from position *h* to discharging station C and by the next forward impulse of the turntable is moved in empty condition to position *i* and at the succeeding impulse is moved past discharging station D to position *j*. At the same impulses the mold at position *k* is moved two mold spaces to position *l*, then to discharging station D and after discharge to position *m* two mold spaces past discharging station D. This is a "leapfrog" action like that which occurs at pressing stations A and B and at feeding stations *a* and *b*. At each of discharging stations C and D the associated tongs 23 is actuated to pick up a formed tumbler E and to deposit it on conveyor 32. Pick-up tongs 23 are actuated by a grasping cylinder 30.

In the discharging operation a glass article is lifted from its mold by upward movement of lifting plate 29 against the lower end of pick-up pin 25. When lifted into the ambit of tongs 23, the article is grasped by the tongs under power supplied by cylinder 30. The tongs is then carried radially outward of the turntable on its rod 24 by the associated fluid pressure cylinder 21 or 22 and releases the article under the influence of its grasping cylinder. It has been noted above that although the fluid pressure cylinders 21 and 22 act simultaneously they act independently. It thus is possible to carry the tongs assemblies at the two discharging stations C and D radially outward different distances to deposit the formed articles in a staggered relation on a relatively wide conveyor or to deposit them on two independent conveyors, if so desired.

The apparatus has been described as having a turntable which is rotated intermittently in a counterclockwise direction. It is to be understood, however, that with appropriate rearrangements of the apparatus that rotation may be in a clockwise direction if so desired.

My invention in structure and procedure primarily consists in making an intermittent-action-turntable glass pressing apparatus in which the number of molds carried by the turntable and the means for imparting intermittent motion to the turntable are so related that each impulse imparted to the turntable moves it through a plurality of mold spaces, that is through a distance which is an apportioned multiple of the distance between the centers of adjacent molds and which as herein specifically shown and described is twice the distance between the centers of adjacent molds. Also of importance in the structural organization of the apparatus, the arrangement and action of the pressing plungers permits simultaneous but independent pressing to produce simultaneously two perfect hollow glass articles. The preferred spacing of the pressing plungers three mold-spaces apart accommodates to the positioning of fluid pressure cylinders of adequate diameter for the pressing plungers to act independently and to the described "leapfrog" presentation of molds for feeding and to pressing. The above-noted simultaneous production of two perfect hollow glass articles such as tumblers is possible because of the independent action of the two pressing cylinders which permit them to be independently adjusted to difference in the "gobs" which have been delivered to the two presented molds. The "leapfrog" method of operating glass-pressing apparatus gives a simple but striking answer to the problems of multiple pressing by providing a satisfactory procedure which it is possible to follow in simple apparatus comprising an intermittently propelled turntable.

Referring now to Figs. I and II, it will be observed that the pressing assembly includes the fluid pressure cylinders 13 and 14 and the mold closure elements 15*a* and 16*a* having diameters which are greater than the distance between the mold centers. Due to the peculiarities of press molding, large diameter fluid pressure cylinders and mold closure means are necessary, and these could not be located over adjacent molds 8 where the molds are spaced closely together as shown in order to produce an increase yield as described hereinbefore.

Stated another way, the increase yield of applicant's apparatus could not be obtained in any known manner by placing the assembly above the molds over adjacent molds due to the width or diameter of such assembly.

Thus, it follows that the provision of the three mold spaces between pressing stations imparts speedy indexing of the machine by decreasing the distance between centers of adjacent molds while at the same time providing adequate room for all structural elements essential in the press molding operation.

Naturally, by doubling the number of glass articles formed during each pressing operation it is possible to double the production of single action apparatus of the same general type. It is, however, preferably so to operate as slightly to increase the duration of the dwell at the simultaneously active pressing stations. For example, if generally analogous single action apparatus produces 48 articles per minute, it is desirable to operate the dual action apparatus at a rate to produce about 80 articles per minute. This gives a greatly increased overall production coupled with a substantial decrease in the number of articles rejected because of imperfect formation. In pressing some glass articles "dwell" is of particular importance. In pressing glass articles of relatively heavy structure such as nappies or ash trays or false-bottom tumblers inadequate dwell causes what is known as a "sucking" tendency as the forming dies are retracted. That is, there is a tendency for the glass to follow the forming die as it moves upward in the mold. Such "sucking" causes at least visual irregularity and sometimes even structural irregularity in the pressed article. It thus is impossible in forming many sorts of glass articles, satisfactorily to speed-up the indexing of intermittent glass pressing apparatus beyond an undesirably slow production rate. In the use of single action intermittent machines there is thus a delicate balance between speed and proportion of rejected articles and this balance tends to vary during a run of the machine. By using the apparatus of the invention herein described it is possible to slow the indexing and to increase dwell to the point of safety in attaining a high proportion of perfect articles without making the operation uneconomical because of a low production rate. This makes the invention of particularly great value in pressing glass articles of the sort in which it is important that adequate dwell be provided.

The plural action as herein described is to be considered ideal both from the viewpoint of method and from the viewpoint of apparatus. From the viewpoint of method the action lends itself perfectly to a timed correlation of movements by which an adequate temperature of the gobs is retained between feeding and pressing and by which an adequate dwell is provided between each intermittent impulse imparted to the mold-carrying turntable. In terms of apparatus it gives a machine which while of increased size with respect to the conventional single action apparatus is nonetheless sufficiently restricted in size as to avoid an unwieldy structure. Also the simplicity of single action apparatus is retained.

Having described an embodiment of my invention in terms of both method and apparatus, it is to be understood that within the ambit of the claims appended hereto the invention embraces various modifications and changes both in structural details and in details of operating procedure.

I claim as my invention:

1. Press-molding apparatus for producing formed glass articles comprising a turntable, a plurality of uniformly spaced molds on said turntable, two feeding stations spaced apart three mold spaces and two pressing assemblies spaced apart an equal number of mold spaces with the spacing of the two said feeding stations, the said two feeding stations being positioned one to each side of one of the said pressing assemblies, and impelling means for the said turntable constructed and arranged to move the turntable intermittently through two mold spaces at each step to present two molds thereon simultaneously and in the said spaced relation to action at the said feeding stations and pressing assemblies, the longest horizontal dimension of the pressing assembly above each mold at a pressing station being greater than the distance between the centers of adjacent molds.

2. Press-molding apparatus for producing formed glass articles comprising a turntable, a plurality of uniformly spaced molds on said turntable, two feeding stations and two pressing assemblies both spaced apart three mold spaces, one of the said feeding stations being spaced two mold spaces rearwardly of one of the said pressing assemblies with respect to the direction of rotation of the said turntable and the other said feeding station being positioned one mold space past the said one pressing assembly, and impelling means for the said turntable constructed and arranged to move the turntable intermittently through two mold spaces at each step to present two molds thereon in non-sequential "leapfrog" manner simultaneously to action at the said feeding stations and pressing assemblies, the longest horizontal dimension of the pressing assembly above each mold at a pressing station being greater than the distance between the centers of adjacent molds.

3. Press-molding apparatus for producing formed glass articles comprising a turntable, a plurality of uniformly spaced molds on said turntable, two pressing assemblies spaced apart three mold spaces comprising a pressing plunger, closure elements, and a fluid pressure cylinder in each said assembly, said fluid pressure cylinders being constructed and arranged to act independently and simultaneously, two feeding stations spaced apart an equal number of mold spaces with the spacing of the two said pressing assemblies and comprising each means for delivering a gob of viscous glass to a mold on the said turntable, the said two feeding stations being positioned one to each side of one of the said pressing assemblies, the longest horizontal dimension of the pressing assembly above each mold at a pressing station being greater than the distance between the centers of adjacent molds, and impelling means for the said turntable constructed and arranged to move the turntable intermittently through two mold spaces at each step to present two molds thereon simultaneously to action at the said feeding and pressing assemblies.

4. Press-molding apparatus for producing formed glass articles comprising a turntable, a plurality of uniformly spaced molds on said turntable, two pressing assemblies comprising a pressing plunger, closure elements, and a fluid pressure cylinder in each said assembly, said pressing assemblies being spaced apart three mold spaces and the said fluid pressure cylinders thereof being constructed and arranged to act simultaneously and independently, two feeding stations spaced apart an equal number of mold spaces with the spacing of the two said pressing assemblies and comprising each means for delivering a gob of viscous glass to a mold on the said turntable, one of the said feeding stations being spaced two mold spaces rearwardly of one of the said pressing assemblies with respect to the direction of rotation of the said turntable and the other said feeding station being positioned one mold space past the said one pressing assembly, the longest horizontal dimension of the pressing assembly above each mold at a pressing station being greater than the distance between the centers of adjacent molds, and impelling means for the said turntable constructed and arranged to move the turntable intermittently through two mold spaces at each step to present two molds thereon in non-sequential "leapfrog" manner simultaneously to action at the said feeding and pressing assemblies.

5. Press-molding apparatus for producing formed glass articles comprising a turntable, a plurality of uniformly spaced molds on said turntable, two feeding stations and two pressing assemblies both spaced apart three mold spaces, one of the said feeding stations being spaced two mold spaces rearwardly of one of the said pressing assemblies with respect to the direction of rotation of the said turntable and the other said feeding station being positioned one mold space past the said one pressing assembly, the longest horizontal dimension of the pressing assembly above each mold at a pressing station being greater than the distance between the centers of adjacent molds, impelling means for the said turntable constructed and arranged to move the turntable intermittently through two mold spaces at each step to present two molds thereon in non-sequential "leapfrog" manner simultaneously to action at the said feeding and pressing assemblies, and two discharging stations each comprising pick-up tongs and a tongs-positioning cylinder, the said cylinders being constructed and arranged to act independently and simultaneously and the said discharging stations being spaced apart a number of mold spaces equal to the spacing of the said feeding stations and the said pressing assemblies.

6. Press-molding apparatus for producing formed glass articles comprising a turntable, a plurality of uniformly spaced molds on said turntable, two pressing assemblies comprising a pressing plunger, closure elements, and a fluid pressure cylinder in each said station, said pressing assemblies being spaced apart three mold spaces and the said fluid pressure cylinders thereof being constructed and arranged to act simultaneously and independently, two feeding stations spaced apart an equal number of mold spaces with the spacing of the two said pressing assemblies and comprising each means for delivering a gob of viscous glass to a mold on the said turntable, one of the said feeding stations being spaced two mold spaces rearwardly of one of the said pressing assemblies with respect to the direction of rotation of the said turntable and the other said feeding station being positioned one mold space past the said one pressing assembly, the longest horizontal dimension of the pressing assembly above each mold at a pressing station being greater than the distance between the centers of adjacent molds, impelling means for the said turntable constructed and arranged to move the turntable intermittently through two mold spaces at each step to present two molds thereon in non-sequential "leapfrog" manner simultaneously to action at the said feeding stations and pressing assemblies, and two discharging stations each comprising pick-up tongs and a tongs-positioning cylinder, the said cylinders being constructed and arranged to act independently and simultaneously and the said discharging stations being spaced apart a number of mold spaces equal to the spacing of the said feeding stations and the said pressing assemblies.

7. Press-molding apparatus for producing formed glass articles comprising a turntable, a plurality of uniformly spaced molds on said turntable, two feeding stations and two pressing assemblies both spaced apart three mold spaces, one of the said feeding stations being spaced two mold spaces rearwardly of one of the said pressing assemblies with respect to the direction of rotation of the said turntable and the other said feeding station being positioned one mold space past the said one pressing assembly, the longest horizontal dimension of the pressing assembly above each mold at a pressing station being greater than the distance between the centers of adjacent molds, impelling means for the said turntable constructed and arranged to move the turntable intermittently through two mold spaces at each step to present two molds thereon in non-sequential "leapfrog" manner simultaneously to action at the said feeding stations and pressing assemblies, and two discharging stations each comprising pick-up tongs and a tongs-positioning cylinder, the said cylinders being constructed and arranged to act simultaneously and the said discharging stations being spaced apart a number of mold spaces equal to the spacing of the said feeding stations and the said pressing assemblies.

8. Press-molding apparatus for producing formed glass articles comprising a turntable, a plurality of uniformly spaced molds on said turntable, two pressing assemblies comprising a pressing plunger, closure elements, and a fluid pressure cylinder in each said assembly, said pressing assemblies being spaced apart three mold spaces and the said fluid pressure cylinders thereof being constructed and arranged to act simultaneously and independently, two feeding stations spaced apart an equal number of mold spaces with the spaces of the two said pressing assemblies and comprising each, means for delivering a gob of viscous glass to a mold on the said turntable, one of the said feeding stations being spaced two mold spaces rearwardly of one of the said pressing assemblies with respect to the direction of rotation of the said turntable and the other said feeding station being positioned one mold space past the said one pressing assembly, the longest horizontal dimension of the pressing assembly above each mold at a pressing station being greater than the distance between the centers of adjacent molds, impelling means for the said turntable constructed and arranged to move the turntable intermittently through two mold spaces at each step to present two molds thereon in non-sequential "leapfrog" manner simultaneously to action at the said feeding and pressing assemblies, and two discharging stations each comprising pick-up tongs and a tongs-positioning cylinder, the said cylinders being constructed and arranged to act simultaneously and the said discharging stations being spaced apart a number of mold spaces equal to the spacing of the said feeding stations and the said pressing assemblies.

References Cited in the file of this patent
UNITED STATES PATENTS
2,357,501    Carnahan _____ Sept. 5, 1944